United States Patent
Fushihara

(10) Patent No.: US 7,056,231 B2
(45) Date of Patent: Jun. 6, 2006

(54) GOLF BALL

(75) Inventor: Kazuhisa Fushihara, Kobe (JP)

(73) Assignee: SRI Sports Limited, Kobe (JP)

( * ) Notice: Subject to any disclaimer, the term of this patent is extended or adjusted under 35 U.S.C. 154(b) by 5 days.

(21) Appl. No.: 10/761,263

(22) Filed: Jan. 22, 2004

(65) Prior Publication Data

US 2004/0152540 A1 Aug. 5, 2004

(30) Foreign Application Priority Data

Jan. 24, 2003 (JP) .............. 2003-016282

(51) Int. Cl.
*A63B 37/00* (2006.01)
(52) U.S. Cl. .................................... 473/351
(58) Field of Classification Search ................ 473/378, 473/373, 351, 368, 374, 367, 376
See application file for complete search history.

(56) References Cited

U.S. PATENT DOCUMENTS

| | | | |
|---|---|---|---|
| 4,561,657 A | 12/1985 | Tominaga et al. | |
| 4,965,323 A | 10/1990 | Watanabe et al. | |
| 5,731,371 A * | 3/1998 | Nesbitt et al. | 524/11 |
| 6,136,906 A | 10/2000 | Sano | |
| 6,846,879 B1 * | 1/2005 | Iwami | 525/179 |
| 2001/0011046 A1 * | 8/2001 | Ichikawa et al. | 473/371 |
| 2002/0065150 A1 * | 5/2002 | Kato et al. | 473/371 |
| 2002/0086742 A1 | 7/2002 | Yokota et al. | |

FOREIGN PATENT DOCUMENTS

| | | |
|---|---|---|
| JP | 60-92781 A | 5/1985 |
| JP | 8-196661 A | 8/1996 |
| JP | 9-235413 A | 9/1997 |
| JP | 11-57068 A | 3/1999 |

\* cited by examiner

*Primary Examiner*—Raeann Gorden
(74) *Attorney, Agent, or Firm*—Birch, Stewart, Kolasch & Birch, LLP

(57) ABSTRACT

A golf ball achieving both excellent hit feeling and good restitution performance by using a rubber composition having moderate hardness and sufficient restitution performance is provided. The golf ball includes a rubber composition obtained by blending 10 to 50 parts by mass of a co-crosslinking agent and 0.1 to 6 parts by mass of a crosslinking initiator with 100 parts by mass of a rubber component. The rubber component contains at least 80 mass percent of hydrogenated polybutadiene having a double bond residual rate of 80 to 99% or preferably 85 to 99%, and cis-1,4-structure content rate of not smaller than 90% or preferably not smaller than 95%. Polybutadiene is obtained by hydrogenating a part of its double bonds.

7 Claims, 1 Drawing Sheet

GOLF BALL

This Nonprovisional application claims priority under 35 U.S.C. § 119(a) on Patent Application No(s). 2003-016282 filed in Japan on Jan. 24, 2003, the entire contents of which are hereby incorporated by reference.

BACKGROUND OF THE INVENTION

1. Field of the Invention

The present invention relates to a golf ball achieving both excellent hit feeling and good restitution performance.

2. Description of the Background Art

A core of a golf ball has conventionally been manufactured by heating a rubber composition, obtained by mixing unsaturated carboxylic acid metal salt serving as a co-crosslinking agent and a free radical initiator with a rubber component mainly consisting of polybutadiene, so as to form crosslinking among main chains of rubber molecules. As the unsaturated carboxylic acid metal salt, zinc acrylate or zinc methacrylate has generally been used. Co-crosslinking is formed by graft polymerization of the unsaturated carboxylic acid metal salt and a main chain of polybutadiene by a free radical initiator such as dicumyl peroxide. Here, a dispersion state of the unsaturated carboxylic acid metal salt in the rubber composition and a reaction speed of crosslinking to the main chain of the rubber molecule considerably affect a fundamental physical property of the rubber composition after crosslinking as well as characteristics of a golf ball fabricated with the same.

Therefore, improvement in dispersibility of zinc acrylate in the rubber composition by coating a particle surface of the zinc acrylate with a higher fatty acid or higher fatty acid metal salt has conventionally been proposed (see U.S. Pat. No. 4,561,657 and Japanese Patent Laying-Open No. 60-92781).

In addition, as a method of improving dispersibility of the unsaturated carboxylic acid metal salt in the rubber composition by using the unsaturated carboxylic acid metal salt of which mean particle size is controlled, two methods have been proposed: a method of using the unsaturated carboxylic acid metal salt having a mean particle size of not larger than 51 μm (see Japanese Patent Laying-Open No. 8-196661 and Japanese Patent Laying-Open No. 11-57068); and a method of using as a co-crosslinking agent, unsaturated carboxylate having size distribution of 0.1 to 5 μm and a mean particle size of 1 to 4.5 μm (see Japanese Patent Laying-Open No. 9-235413 and U.S. Pat. No. 6,136,906).

These methods are preferable in order to improve dispersibility of the co-crosslinking agent in the rubber composition and increasing hardness of the rubber composition. With these methods, however, the co-crosslinking agent is finely dispersed, and accordingly, crosslinking density among the main chains of the rubber molecules giving the largest contribution to the restitution performance is lowered. On the other hand, graft polymerization pattern of the co-crosslinking agent and the main chains of the rubber molecules that do not give much contribution to the restitution performance is increased, whereby the restitution performance is not sufficiently achieved.

Meanwhile, another method of improving the restitution performance of the rubber composition has been proposed (see U.S. Publication No. 2002/0086742A1), in which α,β-unsaturated carboxylic acid metal salt having a carbon number of 3 to 8 and the mean particle size of 6 to 30 μm is used as the co-crosslinking agent so as to avoid excessively large surface area, and the co-crosslinking agent is blended by an amount of 15 to 50 parts by weight with respect to a base rubber of 100 parts by weight so as to adjust reactivity of the co-crosslinking agent with the base material. With this method, however, radicals are produced by an initiator in the presence of the co-crosslinking agent. Therefore, crosslinking among polymers, reaction of a polymer with the co-crosslinking agent and reaction among co-crosslinking agents simultaneously occur. In addition, heat is generated by polymerization and fluidity of the polymer is increased, whereby the co-crosslinking agent that initially aggregated will be dispersed. Moreover, since there is a temperature difference between the inside and the outside of the core, it is difficult to maintain the state of the co-crosslinking agent constant. From the above-described reasons, it is difficult to achieve sufficient restitution performance.

SUMMARY OF THE INVENTION

An object of the present invention is to provide a golf ball achieving both excellent hit feeling and good restitution performance by using a rubber composition having moderate hardness and sufficiently large coefficient of restitution.

According to the present invention, a golf ball is provided, which includes a rubber composition obtained by blending 10 to 50 parts by mass of a co-crosslinking agent and 0.1 to 6 parts by mass of a crosslinking initiator with 100 parts by mass of a rubber component. The rubber component contains at least 80 mass percent of hydrogenated polybutadiene having a double bond residual rate of 80 to 99% or more preferably of 85 to 99%, and cis-1,4-structure content rate of not smaller than 90% or more preferably of not smaller than 95%. In addition, according to the present invention, a golf ball is provided by using α, β-unsaturated carboxylic acid or α,β-unsaturated carboxylic acid metal salt as the co-crosslinking agent. Moreover, according to the present invention, a golf ball is formed by a core composed of the rubber composition and a cover placed around the core.

According to the present invention, a hydrogenated polybutadiene rubber in which double bond is allowed to moderately remain is blended as a component of the rubber composition forming a core layer or the like of a golf ball. By setting an amount of the double bond in polybutadiene to be within an appropriate range, crosslinking reaction of polybutadiene is moderately lowered and reaction among the co-crosslinking agents is accelerated, thereby increasing the particle size of the co-crosslinking agent. Therefore, a rubber composition having moderate hardness and sufficiently large coefficient of restitution can be obtained. On the other hand, increase in the cis-1,4-structure content rate in polybutadiene can also improve the coefficient of restitution. Thus, a golf ball achieving both excellent hit feeling and good restitution performance can be provided.

The foregoing and other objects, features, aspects and advantages of the present invention will become more apparent from the following detailed description of the present invention when taken in conjunction with the accompanying drawings.

Figure 4:
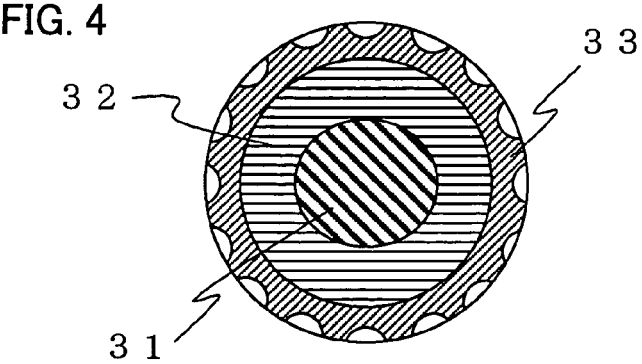

FIG. 4 is a cross-sectional view of a thread-wound golf ball in which a thread-wound layer 32 is placed around a core 31 serving as an innermost layer, and a cover 33 is placed around thread-wound layer 32.

DESCRIPTION OF THE PREFERRED EMBODIMENTS

In the rubber component used in the present invention, the residual rate of the double bond in the hydrogenated polybutadiene is 80 to 99% and preferably 85 to 99%. If the double bond residual rate is low, reactivity with the co-crosslinking agent is significantly lowered, resulting in a longer time period for reaction. In addition, as an amount of the double bond is small, required hardness cannot be obtained, leading to lower restitution performance. On the other hand, if the double bond residual rate is high, reaction behavior is not changed as compared with a conventional example, and an effect specific to the present invention cannot be attained. Therefore, the lower limit of the double bond residual rate in the hydrogenated polybutadiene is desirably set to not smaller than 90%, more preferably to not smaller than 93%, and in particular to not smaller than 95%. The upper limit thereof can be set to not larger than 98%, or to not larger than 97%. Cis-1,4-structure content rate in the hydrogenated polybutadiene is desirably set to not smaller than 90%, more preferably to not smaller than 93%, further preferably to not smaller than 95%, and in particular to not smaller than 96%. If the cis-1,4-structure content rate is lower than 90%, required restitution performance cannot be obtained. Here, the larger the cis-1,4-structure content rate is, the more desirable. For a reason of procurement of a material, however, the cis-1,4-structure content rate may be limited to not larger than 99%, or not smaller than 98%.

A rubber other than the hydrogenated polybutadiene may be contained as the rubber component, unless the content exceeds 20 mass percent. For example, natural rubber, isoprene rubber, butyl rubber, ethylene-propylene rubber, styrene-butadiene rubber, or the like may be blended.

For a co-crosslinking agent, for example, α,β-unsaturated carboxylic acid such as acrylic acid, methacrylic acid, maleic acid, fumaric acid or itaconic acid, or a metal salt of such α,β-unsaturated carboxylic acids; quinone dioxime-based compound such as p-quinone dioxime or p,p-dibenzoyl quinone dioxime; methacrylate-based compound such as lauryl methacrylate, ethylene glycol acrylate, triethylene glycol dimethacrylate, polyethylene glycol dimethacrylate, or trimethylol propene trimethacrylate; or allyl-based compound such as diallyl fumarate, diallyl phthalate, or tetraallyl oxyethane may be used. For the α,β-unsaturated carboxylic acid or the metal salt thereof, acrylic acid, methacrylic acid, or acrylic acid metal salt or methacrylic acid metal salt being metal salt of the former, or mixture thereof may suitably be used. For an innermost layer or an intermediate layer of a multi-layer golf ball, in particular, acrylic acid and/or acrylic acid metal salt is suitably used in view of improving the restitution performance. In a one-piece golf ball where emphasis is placed on durability in many cases, methacrylic acid and/or methacrylic acid metal salt is also particularly suitable. Examples of the metal salt include metal salts of zinc, sodium, magnesium, calcium, aluminum, or the like, and zinc salt is particularly preferable. For the use of the α,β-unsaturated carboxylic acid or the metal salt thereof as the co-crosslinking agent, a method of obtaining a carboxylic acid metal salt by reaction of the α,β-unsaturated carboxylic acid with the metal salt such as zinc oxide or aluminum oxide, or a method of directly blending the α,β-unsaturated carboxylic acid metal salt may be possible. A blended amount of the co-crosslinking agent is preferably set to 10 to 50 parts by mass with respect to 100 parts by mass of the rubber component. If the blended amount is less than 10 parts by mass, sufficient crosslinking density is not obtained. On the other hand, if the blended amount is larger than 50 parts by mass, excessive hardness is obtained and the restitution performance is deteriorated.

For the crosslinking initiator, organic peroxide can preferably be used. As a pattern of crosslinking of the main chain of polybutadiene initiated by the organic peroxide mainly affects the restitution performance, the blended amount of the organic peroxide is determined taking into account a desired characteristic of a core. For the organic peroxide, for example, benzoyl peroxide, dicumyl peroxide, di-tert-butyl peroxide, tert-butyl cumyl peroxide, methyl ethyl ketone peroxide, cumene hydro peroxide, 2,5-dimethyl-2,5-di(tert-butyl peroxy)hexane, 2,5-dimethyl-2,5-di(benzoylperoxy) hexane, tert-butyl peroxybenzene, 2,4-dichloro benzoyl peroxide, 1,1-di-tert-butylperoxy-3,3,5-trimethyl cyclohexane, n-butyl-4,4-di-tert-butyl peroxy valerate, or the like may suitably be used. The blended amount of the organic peroxide is preferably set to 0.1 to 6 parts by mass and more preferably to 0.2 to 2 parts by mass with respect to the rubber component of 100 parts by mass. If the blended amount is less than 0.1 part by mass, the reaction speed and accordingly the crosslinking density are lowered, and sufficient hardness is not obtained. On the other hand, if the blended amount is larger than 6 parts by mass, the crosslinking density and the hardness will excessively be high, resulting in poorer feeling in hitting the golf ball.

For a filler, in order to adjust specific gravity, inorganic salts such as barium sulfate, calcium carbonate, zinc oxide or the like, or a common inorganic filler such as clay may be used. The blended amount of the filler is preferably set to 5 to 70 parts by mass and more preferably to 5 to 60 parts by mass with respect to the rubber component of 100 parts by mass. In addition, a softening agent, an antioxidant, a colorant or the like may be blended as required.

In order to improve the restitution performance, a vulcanization accelerator and a vulcanizing agent for increasing the crosslinking density may be added to the rubber composition used in the present invention. For the vulcanization accelerator, for example, organic sulfur compounds including thiophenols such as penta chloro thiophenol, 4-tert-butyl thiophenol or 2-benzamide thiophenol; thio carboxylic acids such as thiobenzoic acid; and sulfides such as diphenyl monosulfide, diphenyl disulfide, diphenyl polysulfide, dipenta chloro diphenyl disulfide, morpholine disulfide, or dixylyl disulfide may suitably be used. The blended amount of the vulcanization accelerator is preferably set to 0.2 to 3 parts by mass with respect to the base rubber of 100 parts by mass.

Figure 1:
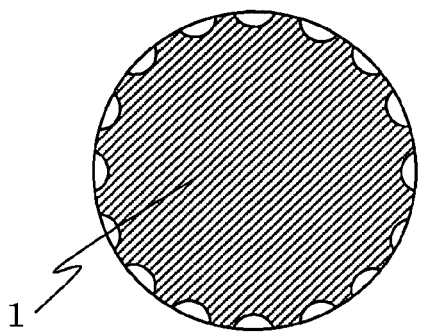
FIG. 1 is a cross-sectional view of a one-piece golf ball 1 obtained by integrally molding a rubber composition.
Figure 2:
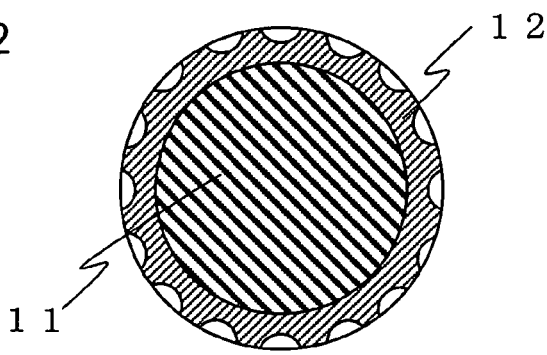
FIG. 2 is a cross-sectional view of a two-piece golf ball in which a cover 12 is placed around a core 11.
Figure 3:
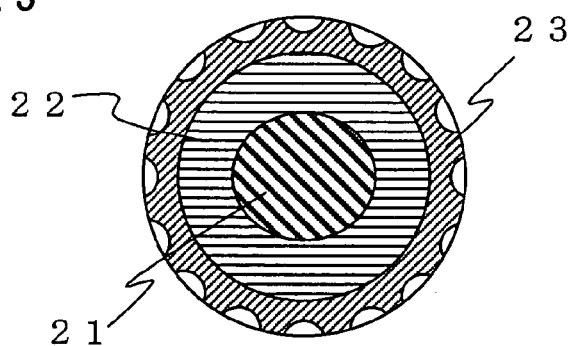
FIG. 3 is a cross-sectional view of a three-piece golf ball in which an intermediate layer 22 is placed around a core 21 serving as an innermost layer, and a cover 23 is placed around intermediate layer 22.

In the golf ball according to the present invention, the rubber composition described above can be used as a rubber composition for a core 11 of a one-piece golf ball 1 shown in FIG. 1 and a two-piece golf ball shown in FIG. 2; a solid core 21 serving as an innermost layer and an intermediate layer 22 formed between the core and a cover in a multiple solid golf ball consisting of three or more pieces shown in FIG. 3; and a core 31 of a thread-wound golf ball shown in FIG. 4. Typical exemplary forms according to the present invention include a two-piece golf ball and a multi-piece golf ball obtained by placing a cover around a core, formed by kneading the rubber composition.

The rubber composition can be fabricated in the following manner. The rubber component, the co-crosslinking agent, the crosslinking initiator, and the filler are mixed by a roll, a kneader, a Banbury, or the like. Thereafter, the mixture is heated under pressure for an appropriate period of time, followed by vulcanization in a mold with a method such as press-molding. A condition for vulcanization may be set as appropriate, however, heating is preferably performed at a temperature of 130 to 200° C. for 10 to 60 minutes, or more preferably at a temperature of 150 to 175° C. for 10 to 40 minutes.

Other than the one-piece golf ball according to the present invention, for example, a golf ball structured as shown in FIGS. 2 to 4 is manufactured by placing a cover around a core.

Usually, an ionomer resin is preferably used as a main component for the cover. Examples of the ionomer resin include an ionomer resin obtained by neutralization with metal ions, of at least a part of carboxyl groups in a copolymer of α-olefin and α,β-unsaturated carboxylic acid having a carbon number of 3 to 8, and an ionomer resin obtained by neutralization with metal ions, of at least a part of carboxyl groups in a ternary copolymer of α-olefin, α,β-unsaturated carboxylic acid having a carbon number of 3 to 8, and α,β-unsaturated carboxylate having a carbon number of 2 to 22. For the α-olefin described above, ethylene, propylene, 1-butene, 1-pentene or the like is used for example, and ethylene is in particular preferable. For the α,β-unsaturated carboxylic acid having a carbon number of 3 to 8, acrylic acid, methacrylic acid, fumaric acid, maleic acid, crotonic acid, or the like is used for example, and acrylic acid and methacrylic acid are in particular preferable. For the unsaturated α, β-carboxylate having a carbon number of 2 to 22, methyl, ethyl, propyl, n-butyl, isobutyl ester or the like of acrylic acid, methacrylic acid, fumaric acid, maleic acid or the like is used for example, and acrylate and methacrylate are in particular preferable.

Examples of the metal ion neutralizing at least a part of carboxyl groups in the copolymer of α-olefin and α,β-unsaturated carboxylic acid having a carbon number of 3 to 8 or the ternary copolymer of α-olefin, α,β-unsaturated carboxylic acid having a carbon number of 3 to 8 and α,β-unsaturated carboxylate having a carbon number of 2 to 22 include sodium ion, lithium ion, zinc ion, magnesium ion, and potassium ion, for example.

Exemplary commercial products of the ionomer resin include ionomer resins of binary copolymer commercially available from DuPont-Mitsui Polychemical Co., Ltd, such as Hi-milan 1555 (Na), Hi-milan 1557 (Zn), Hi-milan 1605 (Na), Hi-milan 1706 (Zn), Hi-milan 1707 (Na), Hi-milan AM7318 (Na), Hi-milan AM7315 (Zn), Hi-milan AM7317 (Zn), Hi-milan AM7311 (Mg), and Hi-milan MK7320 (K), as well as ionomer resins of ternary copolymer such as Hi-milan 1856 (Na), Hi-milan 1855 (Zn), and Hi-milan AM7316 (Zn). In addition, the ionomer resins commercially available from DuPont Co., Ltd. include Surlyn 8945 (Na), Surlyn 8940 (Na), Surlyn 8945 (Na), Surlyn 9910 (Zn), Surlyn 9945 (Zn), Surlyn 7930 (Li), and Surlyn 7940 (Li) as well as ternary copolymer-based ionomer resins such as Surlyn AD8265 (Na) and Surlyn AD8269 (Na).

Examples of the ionomer resins commercially available from Exxon Corp. include Iotec 7010 (Zn) and Iotec 8000 (Na). Here, Na, Zn, K, Li, Mg or the like shown in parentheses following the product name of the ionomer resin designates a metal type of the metal ion for neutralization. In the present invention, two or more types of the above-mentioned resins may be mixed so as to provide the ionomer resin used in the composition of the cover, or alternatively, two or more types of ionomer resins neutralized by a monovalent metal ion and ionomer resins neutralized by a bivalent metal ion may be mixed for use. Other than the ionomer resin, polyethylene, polypropylene, polystyrene, ABS resin, methacrylate resin, polyethylene terephthalate, ACS resin, and polyamide may be used.

From a viewpoint of improving the restitution performance and durability of the cover, a thermoplastic elastomer such as styrene-based thermoplastic elastomer, urethane-based thermoplastic elastomer, ester-based thermoplastic elastomer, olefin-based thermoplastic elastomer, or amide-based thermoplastic elastomer may be blended as required. In addition, titanium oxide, a colorant, a photo-stabilizer, or an antioxidant may be added as required.

In the present invention, a method of placing the cover around the core or the intermediate layer is not limited. For example, a method of direct injection molding onto the core, or a method in which a hemispherical half shell is formed and two such shells are placed around the core, followed by compression molding applying heat and pressure in a mold may be adopted. Though a thickness of the cover is not limited in particular, the thickness of approximately 0.3 to 3.5 mm is usually suitable. If the thickness is smaller than 0.3 mm, strength and durability of the cover are lowered. On the other hand, if the thickness is larger than 3.5 mm, volume percent of the cover component in the entire ball becomes too large to lower the restitution performance of the ball. It is to be noted that the surface of the cover may be provided with working such as dimples or a marking, as required.

A clear coating film may be formed on the surface of the ball. For clear coating, a urethane resin or an acrylic resin may be used as a component for forming the coating film. A fluorescent brightening agent, an UV absorber, an antioxidant, or a photo-stabilizer may be blended as required.

EXAMPLE (1) Preparation of Hydrogenated Polybutadiene Rubber

High cis polybutadiene rubber (containing cis-1,4-polybutadiene: 96%) manufactured by JSR Corporation was dissolved in toluene, and hydrogenation using palladium-carbon catalyst was performed in accordance with Example 1 in U.S. Pat. No. 4,965,323. Hydrogenated polybutadiene rubbers BR(A), BR(B), BR(C), and BR(D) were obtained.

(2) Measurement of Double Bond Residual Rate in Hydrogenated Polybutadiene Rubber and Content Rate of cis-1,4-polybutadiene A degree of unsaturation of the polybutadiene rubber before and after hydrogenation treatment was measured based on JIS K-0070. A percentage of unsaturation of BR(A), BR(B), BR(C), and BR(D) when the degree of unsaturation of polybutadiene (BR(E)) before treatment was assumed as 100 was defined as double bond residual rate (%).

Measurement of content rate of cis-1,4-polybutadiene was performed, using infrared absorption spectrum analysis. Measurement was obtained from a rate of absorption intensity of cis 740 $cm^{-1}$, trans 967 $cm^{-1}$ and vinyl 910 $cm^{-1}$.

A measurement result is shown in Table 1.

TABLE 1

| | | Double Bond Residual rate (%) | Cis Content rate (%) |
|---|---|---|---|
| BR(A) | Treated Product of JSR BR01 | 97 | 96 |
| BR(B) | Treated Product of JSR BR01 | 95 | 96 |
| BR(C) | Treated Product of JSR BR01 | 90 | 95 |
| BR(D) | Treated Product of JSR BR01 | 85 | 95 |
| BR(E) | JSR BR01 | 100 | 96 |

(3) Fabrication of Core

The rubber components shown in Table 1 were used, and the components to be blended were kneaded in accordance with compositions shown in Table 2. A kneader was used for kneading. The prepared rubber composition was placed in a mold and subjected to press-molding at 160° C. for 20 minutes. A core of a diameter of 38.5 mm and a weight of 34.6 g was fabricated. An amount of deformation by compression of the obtained core was then measured. A measurement result is shown in Table 2.

Details of polymer components and blended agents used in the rubber composition in Table 2 are as follows.

Note 1: ZNDA-90S manufactured by Nihon Jyoryu Kogyo Co., Ltd. was used as zinc acrylate.

Note 2: Zinc oxide was manufactured by Toho Zinc Co., Ltd.

Note 3: Percumyl D manufactured by NOF Corporation was used as dicumyl peroxide.

Note 4: Hi-milan 1605 manufactured by DuPont-Mitsui Polychemical Co., Ltd. was used as an ionomer neutralized by sodium.

Note 5: Hi-milan 1706 manufactured by DuPont-Mitsui Polychemical Co., Ltd. was used as an ionomer neutralized by zinc.

Note 6: A-220 manufactured by Ishihara Sangyou Kaisha Ltd. was used as titanium oxide.

(4) Preparation of Cover Composition

The blend materials for the cover shown in Table 2 were mixed, using a two-shaft kneading extruder, and the cover composition in a pellet shape was obtained. Conditions for extrusion were as follows.

Screw diameter: 45 mm
Screw rotation speed: 200 rpm
Screw L/D: 35

The composition was heated to 200 to 260° C. at a position of a die of the extruder.

(5) Fabrication of Golf Ball

A golf ball was fabricated in the following manner. The obtained cover composition was used to form a hemispherical half shell. Two of such shells were used to wrap the obtained core, and the core was then subjected to compression molding applying heat and pressure in a mold. The surface of the molded product was painted, and a golf ball having a diameter of 42.8 mm and a weight of 45.4 g was fabricated. Measurement of the coefficient of restitution and evaluation of hit feeling with respect to the obtained golf ball was performed. A result is shown in Table 2.

(6) Evaluation of Characteristics

Evaluation of characteristics of the obtained composition, core and golf ball was performed using the following method.

1) Amount of Deformation by Compression of Core

An amount of deformation (mm) of the core when loads from an initial load of 98N to a final load of 1275N were applied was measured.

2) Coefficient of Restitution

A cylinder made of aluminum and weighing 198.4 g was swung at an initial velocity of 45 m/s to hit the golf ball. A value for coefficient of restitution relative to a case where the value in comparative example 1 was assumed as 100 was calculated from the speed of the hit golf ball. The larger the value is, the better the restitution property is.

3) Hit Feeling

Actual hitting test using a number one wood club (driver, W#1) was conducted with cooperation of 20 amateur golf players whose handicap is at most 15, in order to evaluate impact and restitution feeling in hitting the ball. Evaluation given by the majority of players was adopted as the evaluation of that golf ball. Standard of evaluation is as follows.

Evaluation Standard (Impact)
○ . . . small impact and excellent hit feeling
Δ . . . impact was strong to some extent Evaluation Standard (Restitution Feeling)
○ . . . restitution was felt, that is, "excellent"
Δ . . . heaviness was felt to some extent and restitution was weakly felt In the above example, the rubber composition using the hydrogenated polybutadiene according to the present invention as the rubber component is found to have achieved improvement in the amount of deformation by compression of the core, as compared with comparative example 1 using polybutadiene. In addition, the rubber composition according to the present invention is superior in the coefficient of restitution of the ball. The ball was fabricated under the same condition in examples 1 to 4 and comparative example 1, except for using different types of polybutadiene. The double bond residual rate was 97%, 95%, 90%, 85%, and 100% in examples 1 to 4 and comparative example 1, respectively. On the other hand, the content rate of cis-1,4-structure was 96%, 96%, 95%, 95%, and 96% in examples 1 to 4 and comparative example 1, respectively. It can be seen that the core is provided with moderate hardness and the coefficient of restitution of the ball is improved by setting the double bond residual rate to be within a prescribed range.

TABLE 2

|   |   | Example 1 | Example 2 | Example 3 | Example 4 | Comparative Example 1 |
|---|---|---|---|---|---|---|
| Core Composition | BR(A) | 100 | — | — | — | — |
|  | BR(B) | — | 100 | — | — | — |
|  | BR(C) | — | — | 100 | — | — |
|  | BR(D) | — | — | — | 100 | — |
|  | BR(E) | — | — | — | — | 100 |
|  | Zinc acrylate (Note 1) | 27 | 27 | 27 | 27 | 27 |
|  | Zinc oxide (Note 2) | 20 | 20 | 20 | 20 | 20 |
|  | Dicumyl peroxide (Note 3) | 0.6 | 0.6 | 0.6 | 0.6 | 0.6 |
| Cover Composition | Hi-milan #1605 (Note 4) | 50 | 50 | 50 | 50 | 50 |
|  | Hi-milan #1706 (Note 5) | 50 | 50 | 50 | 50 | 50 |
|  | Titanium oxide (Note 6) | 3 | 3 | 3 | 3 | 3 |
| Physical Property | Amount of deformation by compression of core (mm) | 3.72 | 3.73 | 3.74 | 3.75 | 3.72 |
|  | Coefficient of restitution of ball | 102.4 | 102.5 | 101.9 | 101.1 | 100 |
| Hit Feeling | Impact | ○ | ○ | ○ | ○ | ○ |
|  | Restitution feeling | ○ | ○ | ○ | ○ | Δ |

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A golf ball comprising a rubber composition obtained by blending 10 to 50 parts by mass of a co-crosslinking agent and 0.1 to 6 parts by mass of a crosslinking initiator with 100 parts by mass of a rubber component; wherein said rubber component contains at least 80 mass percent of hydrogenated polybutadiene, and said hydrogenated polybutadiene has a double bond residual rate of 85 to 97% and cis-1,4-structure content rate of at least 90%.

2. The golf ball according to claim 1, wherein said co-crosslinking agent is α,β-unsaturated carboxylic acid or a metal salt of the α,β-unsaturated carboxylic acid.

3. The golf ball according to claim 1, wherein said hydrogenated polybutadiene has a cis-1,4-structure content rate of at least 95%.

4. The golf ball according to claim 1, wherein said hydrogenated polybutadiene has a double bond residual rate of 85 to 95%.

5. The golf ball according to claim 1, wherein said hydrogenated polybutadiene has a cis-1,4-structure content rate of 95 to 99%.

6. The golf ball according to claim 1, wherein said hydrogenated polybutadiene has a cis-1,4-structure content rate of 96 to 99%.

7. A golf ball formed by a core and a cover placed around said core and fabricated with the rubber composition according to claim 1 for said core.

* * * * *